United States Patent [19]

Biedermann et al.

[11] 4,390,270

[45] Jun. 28, 1983

[54] PHOTOGRAPHIC COPIER

[75] Inventors: Ernst Biedermann, Taufkirchen; Günter Findeis, Sauerlach; Klaus Weber, Leverkusen; Wolfgang Zahn, Munich, all of Fed. Rep. of Germany

[73] Assignee: Agfa-Gevaert Aktiengesellschaft, Leverkusen, Fed. Rep. of Germany

[21] Appl. No.: 287,571

[22] Filed: Jul. 28, 1981

[30] Foreign Application Priority Data

Jul. 29, 1980 [DE] Fed. Rep. of Germany ....... 3028676

[51] Int. Cl.³ ............................................. G03B 27/44
[52] U.S. Cl. ...................................... 355/46; 352/133; 354/25; 355/65; 355/68
[58] Field of Search ...................... 354/25; 355/46, 64, 355/65, 66, 68, 43; 352/133

[56] References Cited

U.S. PATENT DOCUMENTS

| | | | |
|---|---|---|---|
| 3,212,396 | 10/1965 | Schwardt et al. | 355/46 X |
| 3,532,045 | 10/1970 | Genahr | 354/25 |
| 3,709,613 | 1/1973 | Zahn et al. | 355/68 X |
| 3,728,020 | 4/1973 | Abrams et al. | 355/65 X |
| 3,738,242 | 6/1973 | Lee et al. | 355/68 X |
| 3,826,567 | 7/1974 | Vockenhuber et al. | 352/133 X |

Primary Examiner—Richard A. Wintercorn
Attorney, Agent, or Firm—Kontler, Grimes & Battersby

[57] ABSTRACT

A copier has a movable housing which accommodates a support for an original to be copied, a source of illumination for the original, a lens system for forming an image of the original and a support for photosensitive material which is to receive the image. The housing has an opening in one of its sides and carries a hinged lid for lighttight sealing of the opening. A reflector is pivotally mounted inside the housing in the vicinity of the opening and can be moved between an operative position in which it intercepts the image from the lens system and an inoperative position in which it does not. When an image of normal size is required, the reflector is in its inoperative position and the image is projected onto the photosensitive material located inside the housing. When an image of large size is required, the reflector is brought into its operative position and the opening in the housing is uncovered. The reflector can then project the image through the opening and onto a large sheet of photosensitive material held on a wall or other suitable support.

13 Claims, 1 Drawing Figure

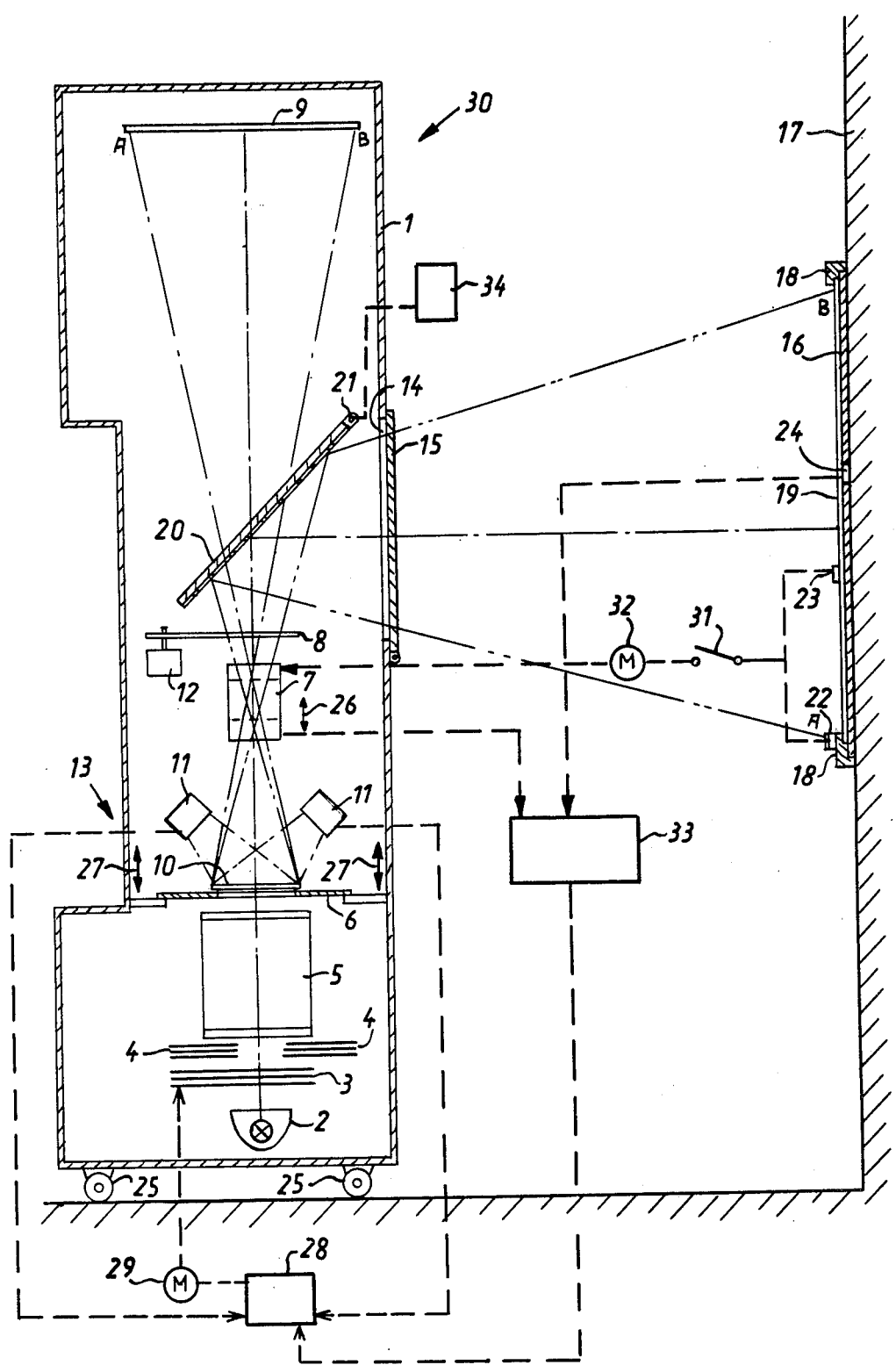

PHOTOGRAPHIC COPIER

BACKGROUND OF THE INVENTION

The invention relates generally to copiers.

More particularly, the invention relates to photographic copiers.

A known photographic copier has a support for an original to be copied and projection means for projecting an image of the original onto strip-like photographic paper. A photoelectrically-controlled device automatically regulates the exposure time.

In copiers of this type, the photographic paper is normally in the form of a roll and travels from a feed box to a take-up box. The dimensions of the copier and the consideration that the weights of the boxes must be within acceptable limits restrict the width of the photographic paper to about 30 centimeters.

Larger copies are generally produced in large enlargers using photographic paper which may be either in the form of a sheet or a specialized roll. Nevertheless, copiers capable of producing large copies directly are also known. However, since large copies are required relatively infrequently, such copies are equipped with few accessories such as automatic exposure control, etc. Furthermore, due to the relatively low degree of utilization, the cost of such copiers is too high for most photofinishers.

OBJECTS AND SUMMARY OF THE INVENTION

It is an object of the invention to provide a copier which is capable of producing large as well as small copies.

Another object of the invention is to provide an affordable copier which is capable of producing large and small copies.

An additional object of the invention is to provide an affordable copier which is capable of producing large copies and is equipped with the accessories found on copiers for making small copies.

The preceding objects and others will become apparent as the description proceeds.

The invention provides a copying installation which comprises supporting means for an original to be copied and projecting means for projecting an image of the original to a first location at which the image has a first size. A characteristic feature of the installation according to the invention resides in reflecting means for reflecting the image of the original to a second location at which the image has a second size.

The copying installation of the invention makes it possible not only to produce copies of normal size on conventional rolls of photosensitive material, e.g., photographic paper, but also to generate substantially larger images. This is achieved without substantial additional technical requirements. Furthermore, with the exception of automatic feed and daylight processing, the accessories and technical features of modern high-capacity printers are now made available for the production of large images.

The novel features which are considered as characteristic of the invention are set forth in particular in the appended claims. The improved machine apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE schematically illustrates a copying installation according to the invention.

DESCRIPTION OF THE PREFERRED EMBODIMENTS

The copying installation of the FIGURE, which is here assumed to be a photographic copying installation, includes a housing 1 which is mounted for movement on wheels 25. At the bottom of the housing 1 is a light or source of illumination 2 which, in upward direction, is followed by an exposure filter 3. The exposure filter 3 has transparent blue, red and green plates which can be pivoted into and out of alignment with the light 2. A preliminary filter 4 is located above the exposure filter 3 and is followed by a light duct 5. The housing 1 further accommodates an objective lens system 7, which is preferably a variable-focus or adjustable lens system as indicated by the double-headed arrow 26, and a shutter 8. The shutter 8 is connected with a drive 12.

A support 6 for an original 10 to be copied is located between the light duct 5 and the lens system 7 and, as indicated by the double-headed arrows 27, may be movable for the purpose of focusing the image of the original 10. At the top of the housing 1 is a support 9 for photosensitive material, in this case photographic paper, on which the image of the original 10 is to be registered.

The original 10 may be in the form of a strip or an individual sheet. On the other hand, the support 9 for the photographic paper is adapted to receive such paper from a roll of the same.

Photographic measuring cells 11 are located above and the original 10 and are inclined relative to the same. The cells 11 sense the density or color composition of the original 10.

The cells 11 are connected to an automatic exposure control unit 28 which, in turn, is connected to a drive 29 for driving the plates of the exposure filter 3. The plates of the exposure filter 3 are pivoted into and out of alignment with the light 2 by the drive 29 in dependence upon the density or color composition of the original 10 as sensed by the cells 11. The operation of the automatic exposure control unit 28 is well known and is described, for example, in U.S. Pat. Nos. 4,192,605 and 4,204,734.

The housing 1 has an access or service side 13 which is on the left of the housing 1 as seen in the FIGURE. The interior of the housing 1 is accessible for servicing via the side 13. The housing 1 further has a side 30 opposite the side 13, that is, on the right of the housing 1 as seen in the FIGURE, which constitutes the rear of the housing 1. The rear side 30 of the housing 1 is provided with a relatively large opening 14 which can be sealed against light by a cover 15 hinged to the rear side 30.

A reflector 20 is mounted in the housing 1 on a pivot 21 and is located at the level of the opening 14. The reflector 20 is pivotable between an inoperative position in which the reflector 20 has a generally vertical orientation and the operative position illustrated. In the operative position, the reflector 20 is located in the path of the rays A-B emanating from the light 2 and deflects these rays towards the opening 14 in the housing 1 as shown. The reflector 20 may be moved between its operative and inoperative positions by hand or via a drive 34.

A panel 16 is arranged at some distance from the rear side 30 of the housing 1 and may, for example, be hung on a wall 17. The panel 16, which here has at least one pair of mutually perpendicular edges, is provided with holding elements 18 for holding photographic paper 19 of large dimensions.

In operation, the reflector 20 is normally in its inoperative position, that is, in a generally vertical orientation, so that it does not intercept the rays A–B emanating from the light 2. The rays A–B can thus freely travel to the support 9 inside the housing 1 to thereby produce small copies of the original 10.

When large copies are to be made, the cover 15 is swung away from the opening 14 and the reflector 20 is pivoted to the illustrated operative position. The reflector 20 now reflects the rays A–B through the opening 14 and onto the large sheet of photographic paper 19 thereby forming an image of the original 10 on the paper 19. Since the distance between the original 10 and the support 9 will generally be different than the distance between the original 10 and the panel 16, it is necessary to focus the image of the original 10 when a change is made from the production of small copies to the production of large copies. If, as is preferred and indicated by the double-handed arrow 26, the lens system 7 is adjustable, focusing may be accomplished by adjustment of the lens system 7. On the other hand, if the lens system 7 is not adjustable, the support 6 for the original 10 may be made movable as indicated by the double-headed arrows 27 and focusing may be achieved by moving the support 6 towards or away from the lens system 7.

In order to insure that the image of the original 10 is correctly oriented on the photographic paper 19, it is necessary to place the original 10 on the support 6 in a position which is the reverse of that used when making copies at the support 9.

Recently, computer-controlled, adjustable objective lens systems have become known which allow changes in magnification to be achieved with simultaneous automatic focusing even when the distance between the original and the photographic paper varies. The copying installation of the invention may also be equipped with a control mechanism for aiding in automatic selection of magnification. Thus, photoelectric sensing elements 22 and 23 may be provided on suitably located masks or adjacent the photographic paper 19. In the illustrated embodiment, the sensing elements 22 and 23 are mounted on respective, mutually perpendicular edges of the panel 16 which holds the paper 19. The sensing elements 22 and 23 are connected with a switch 31 of a drive 32 for the lens system 7 and may be used to achieve optimum illumination of the paper 19. The operation of the sensing elements 22 and 23 is known and is described, for example, in U.S. Pat. No. 4,218,133.

When working at magnifications higher than those which are normally obtained within the housing 1, or when it is necessary to operate at a higher stop setting (smaller aperture) than usual, the exposure time is increased. The required increase in the exposure time may be calculated via a computer 33 using the adjustment parameters of the lens system 7 or measurements of the illumination intensity at the panel 16 in the absence of an original 10 on the support 6. Measurements of the illumination intensity at the panel 16 may be obtained by mounting a photodetector 24 in the panel 16. The computer 33 is connected with the lens system 7 or the photodetector 24 as well as with the automatic exposure control unit 28.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A copying installation, particularly a photographic copying installation comprising:
   (a) supporting means for an original to be copied;
   (b) projecting means for projecting an image of the original to a first location at which the image has a first size, said projecting means comprising a lens;
   (c) reflecting means for reflecting the image of the original to a second location at which the image has a second size, said reflecting means being arranged between said lens and said first location and being mounted for pivotable movement between an operative position in which it reflects the image of the original and an inoperative position; and
   (d) a housing for said supporting means, projecting means and reflecting means, wherein said first location is inside said housing and said second location is outside said housing, said housing having an opening to permit travel of the image to said second location.

2. A copying installation as defined in claim 1, wherein said housing has an access side and another side opposite said access side, said opening being located in said other side.

3. A copying installation as defined in claim 1, wherein said housing is movable.

4. A copying installation as defined in claim 1, comprising a closure for lighttight sealing of said opening.

5. A copying installation as defined in claim 1, comprising a first support for photosensitive material at said first location and a second support for photosensitive material at said second location, said second support including holding means for holding photosensitive material of larger size than is receivable by said first support to thereby permit copying of larger images at said second support than at said first support.

6. A copying installation as defined in claim 1, wherein said reflecting means is arranged to form a substantially vertical image of the original at said second location.

7. A copying installation as defined in claim 1, comprising photoelectrically-controlled means for automatic regulation of the exposure time.

8. A copying installation as defined in claim 1, wherein said supporting means is movable to permit focusing of the image.

9. A copying installation as defined in claim 1, wherein said projecting means comprises an adjustable lens to permit focusing of the image.

10. A copying installation as defined in claim 9, comprising computer means for regulating the exposure time in response to adjustment of said lens.

11. A copying installation as defined in claim 9, comprising photoelectric means for adjusting the magnification of said lens.

12. A copying installation as defined in claim 11, comprising a support for photosensitive material at said second location; and wherein said support has a pair of mutually perpendicular edges and said photoelectric means includes a pair of photoelectric elements mounted on respective ones of said edges.

13. A copying installation as defined in claim 1, comprising photodetecting means at said second location for measuring the illumination intensity and adjusting the exposure time in response to changes in the illumination intensity.

* * * * *